(12) United States Patent
Larson et al.

(10) Patent No.: US 8,281,082 B2
(45) Date of Patent: *Oct. 2, 2012

(54) HYPERVISOR PAGE FAULT PROCESSING IN A SHARED MEMORY PARTITION DATA PROCESSING SYSTEM

(75) Inventors: David A. Larson, Rochester, MN (US); Edward C. Prosser, Rochester, MN (US); Kenneth C. Vossen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/362,402

(22) Filed: Jan. 31, 2012

(65) Prior Publication Data
US 2012/0131260 A1 May 24, 2012

Related U.S. Application Data

(63) Continuation of application No. 12/403,408, filed on Mar. 13, 2009, now Pat. No. 8,166,254.

(60) Provisional application No. 61/059,492, filed on Jun. 6, 2008.

(51) Int. Cl.
*G06F 12/00* (2006.01)

(52) U.S. Cl. ........................................ 711/148; 711/209

(58) Field of Classification Search .................. 711/148, 711/209
See application file for complete search history.

(56) References Cited

U.S. PATENT DOCUMENTS

| 5,909,540 | A | 6/1999 | Carter et al. | |
|---|---|---|---|---|
| RE36,462 | E | * 12/1999 | Chang et al. | ................. 711/209 |
| 6,725,284 | B2 | 4/2004 | Arndt | |
| 6,769,017 | B1 | 7/2004 | Bhat et al. | |
| 6,976,137 | B2 | 12/2005 | Ouren et al. | |
| 7,080,146 | B2 | 7/2006 | Bradford et al. | |
| 7,234,139 | B1 | 6/2007 | Feinberg | |
| 7,305,592 | B2 | 12/2007 | Neiger et al. | |
| 7,337,296 | B2 | 2/2008 | Noel et al. | |
| 7,506,095 | B2 | * 3/2009 | Otte et al. | ........................ 711/6 |
| 7,680,754 | B2 | 3/2010 | Hillier | |
| 7,698,531 | B2 | 4/2010 | Flemming et al. | |
| 7,702,843 | B1 | * 4/2010 | Chen et al. | ........................ 711/6 |
| 7,849,347 | B2 | 12/2010 | Armstrong et al. | |

(Continued)

OTHER PUBLICATIONS

IBM International Technical Support Organization, "HiperSockets Implementation Guide", pp. 1-132 (Mar. 2007).

(Continued)

*Primary Examiner* — Hashem Farrokh
(74) *Attorney, Agent, or Firm* — Matthew C. Zehrer, Esq.; Kevin P. Radigan, Esq.; Heslin, Rothenberg, Farley & Mesiti P.C.

(57) ABSTRACT

Hypervisor page fault processing logic is provided for a shared memory partition data processing system. The logic, responsive to an executing virtual processor of the shared memory partition data processing system encountering a hypervisor page fault, allocates an input/output (I/O) paging request to the virtual processor from an I/O paging request pool and increments an outstanding I/O paging request count for the virtual processor. A determination is then made whether the outstanding I/O paging request count for the virtual processor is at a predefined threshold, and if not, the logic places the virtual processor in a wait state with interrupt wake-up reasons enabled based on the virtual processor's state, otherwise, it places the virtual processor in a wait state with interrupt wake-up reasons disabled.

20 Claims, 13 Drawing Sheets

U.S. PATENT DOCUMENTS

| | | |
|---|---|---|
| 8,046,641 B2 | 10/2011 | Hernandez et al. |
| 2002/0010844 A1 | 1/2002 | Noel et al. |
| 2002/0016812 A1 | 2/2002 | Uchishiba et al. |
| 2002/0087611 A1 | 7/2002 | Tanaka et al. |
| 2002/0138704 A1 | 9/2002 | Hiser et al. |
| 2003/0084372 A1 | 5/2003 | Mock et al. |
| 2004/0139287 A1 | 7/2004 | Foster et al. |
| 2004/0193861 A1 | 9/2004 | Michaelis |
| 2004/0199599 A1 | 10/2004 | Nichols et al. |
| 2005/0071446 A1 | 3/2005 | Graham et al. |
| 2005/0132249 A1 | 6/2005 | Burton et al. |
| 2005/0160151 A1 | 7/2005 | Rawson, III |
| 2005/0240932 A1 | 10/2005 | Billau et al. |
| 2005/0278719 A1 | 12/2005 | Togawa |
| 2006/0075207 A1 | 4/2006 | Togawa et al. |
| 2006/0101224 A1 | 5/2006 | Shah et al. |
| 2006/0123217 A1 | 6/2006 | Burdick et al. |
| 2006/0146057 A1 | 7/2006 | Blythe |
| 2006/0195673 A1 | 8/2006 | Arndt et al. |
| 2006/0236059 A1 | 10/2006 | Fleming et al. |
| 2007/0061441 A1 | 3/2007 | Landis et al. |
| 2007/0112999 A1 | 5/2007 | Oney et al. |
| 2007/0210650 A1 | 9/2007 | Togashi |
| 2007/0299990 A1 | 12/2007 | Ben-Yehuda et al. |
| 2008/0040565 A1 | 2/2008 | Rozas et al. |
| 2008/0071755 A1 | 3/2008 | Barsness et al. |
| 2008/0082696 A1 | 4/2008 | Bestler |
| 2008/0082975 A1 | 4/2008 | Oney et al. |
| 2008/0183996 A1 | 7/2008 | Field et al. |
| 2008/0256321 A1 | 10/2008 | Armstrong et al. |
| 2008/0256327 A1 | 10/2008 | Jacobs et al. |
| 2008/0256530 A1 | 10/2008 | Armstrong et al. |
| 2009/0100237 A1 | 4/2009 | Orikasa et al. |
| 2009/0144510 A1 | 6/2009 | Wibling et al. |
| 2009/0307436 A1 | 12/2009 | Larson et al. |
| 2009/0307438 A1 | 12/2009 | Logan et al. |
| 2009/0307439 A1 | 12/2009 | Jacobs et al. |
| 2009/0307440 A1 | 12/2009 | Jacobs et al. |
| 2009/0307441 A1 | 12/2009 | Hepkin et al. |
| 2009/0307447 A1 | 12/2009 | Jacobs et al. |
| 2009/0307538 A1 | 12/2009 | Hernandez et al. |
| 2009/0307688 A1 | 12/2009 | Pafumi et al. |
| 2009/0307690 A1 | 12/2009 | Logan et al. |
| 2009/0307713 A1 | 12/2009 | Anderson et al. |
| 2010/0079302 A1 | 4/2010 | Eide et al. |
| 2010/0083252 A1 | 4/2010 | Eide et al. |

OTHER PUBLICATIONS

Kloster, Jacob Faber et al. "Efficient Memory Sharing in the Xen Virtual Machine Monitor", Department of Computer Science, Aalborg University (Jan. 2006).

Valdez, E. et al., "Retrofitting the IBM POWER Hypervisor to Support Mandatory Access Control", 23rd Annual Computer Security Applications Conference (pp. 221-230) (2007).

Waldspurger, Carl A., "Memory Resource Management in VMware ESX Server." ACM, OSDI '02, (Dec. 2002).

Anderson et al., Office Action for U.S. Appl. No. 12/403,402, filed Mar. 13, 2009 (U.S. Patent Publication No. 2009/0307713 A1) dated Nov. 30, 2011.

Larson et al., Office Action for U.S. Appl. No. 12/403,408, filed Mar. 13, 2009 (US Patent Publication No. 2009/0307436 A1) dated Jul. 15, 2011.

Larson et al., Notice of Allowance for U.S. Appl. No. 12/403,408, filed Mar. 13, 2009 (US Patent Publication No. 2009/0307436 A1) dated Dec. 19, 2011.

Logan et al., Office Action for U.S. Appl. No. 12/403,426, filed Mar. 13, 2009 (US Patent Publication No. 2009/0307438 A1) dated May 26, 2011.

Logan et al., Notice of Allowance for U.S. Appl. No. 12/403,426, filed Mar. 13, 2009 (US Patent Publication No. 2009/0307438 A1) dated Nov. 7, 2011.

Jacobs et al., Office Action for U.S. Appl. No. 12/403,440, filed Mar. 13, 2009 (US Patent Publication No. 2009/0307439 A1) dated Oct. 27, 2011.

Jacobs et al., Office Action for U.S. Appl. No. 12/403,447, filed Mar. 13, 2009 (US Patent Publication No. 2009/0307440 A1) dated May 5, 2011.

Jacobs et al., Notice of Allowance for U.S. Appl. No. 12/403,447, filed Mar. 13, 2009 (US Patent Publication No. 2009/0307440 A1) dated Oct. 18, 2011.

Hepkin et al., Office Action for U.S. Appl. No. 12/403,472, filed Mar. 13, 2009 (US Patent Publication No. 2009/0307441 A1) dated Sep. 22, 2011.

Hepkin et al., Notice of Allowance for U.S. Appl. No. 12/403,472, filed Mar. 13, 2009 (US Patent Publication No. 2009/0307441 A1) dated Jan. 27, 2012.

Jacobs et al., Office Action for U.S. Appl. No. 12/403,485, filed Mar. 13, 2009 (US Patent Publication No. 2009/0307447 A1) dated Apr. 28, 2011.

Jacobs et al., Final Office Action for U.S. Appl. No. 12/403,485, filed Mar. 13, 2009 (US Patent Publication No. 2009/0307447 A1) dated Oct. 7, 2011.

Jacobs et al., Notice of Allowance for U.S. Appl. No. 12/403,485, filed Mar. 13, 2009 (US Patent Publication No. 2009/0307447 A1) dated Dec. 30, 2011.

Hernandez et al., Office Action for (US Letters Patent No. 8,046,641 B2, issued Oct. 25, 2011) dated Jan. 19, 2011.

Jacobs et al., Office Action for U.S. Appl. No. 12/403,459, filed Mar. 13, 2009 (US Patent Publication No. 2009/0307445 A1), dated Mar. 7, 2012.

Logan et al., Office Action for U.S. Appl. No. 13/369,575, filed Feb. 9, 2012, dated Mar. 12, 2012.

Jacobs et al., Office Action for U.S. Appl. No. 13/344,721, filed Jan. 6, 2012, dated Mar. 20, 2012.

Jacobs et al., Office Action for U.S. Appl. No. 13/344,708, filed Jan. 6, 2012, dated Mar. 27, 2012.

Logan et al., Office Action for U.S. Appl. No. 12/403,416, filed Mar. 13, 2009 (US Patent Publication No. 2009/0307690 A1), dated Mar. 30, 2012.

Jacobs et al., Final Office Action for U.S. Appl. No. 12/403,440, filed Mar. 13, 2009 (US Patent Publication No. 2009/0307439 A1) dated Apr. 6, 2012.

Logan et al., Office Action dated Jul. 16, 2012, for U.S. Appl. No. 13/447,393, filed Apr. 16, 2012.

* cited by examiner

HYPERVISOR PAGE FAULT PROCESSING IN A SHARED MEMORY PARTITION DATA PROCESSING SYSTEM

CROSS-REFERENCE TO RELATED APPLICATIONS

This application is a continuation of U.S. patent application Ser. No. 12/403,408, filed Mar. 13, 2009, entitled "Hypervisor Page Fault Processing in a Shared Memory Partition Data Processing System", which was published on Dec. 10, 2009, as U.S. Patent Publication No. 2009/0307436 A1, and which claims the benefit of U.S. provisional application Ser. No. 61/059,492, filed Jun. 6, 2008, entitled "Virtual Real Memory", the entirety of each of which is incorporated herein by reference.

TECHNICAL FIELD

The present invention relates generally to data processing systems, and more particularly, to handling I/O paging request starvation in the hypervisor-managed paging environment of a shared memory partition data processing system.

BACKGROUND OF THE INVENTION

Logical partitions (LPARs) running atop a hypervisor of a data processing system are often used to provide higher-level function than provided by the hypervisor itself. For example, one LPAR may be designated a virtual input/output server (VIOS), which provides input/output (I/O) services to one or more other LPARs of the data processing system. This offloading of higher-level function avoids complex code in the hypervisor, and thus, assists in maintaining the hypervisor small and secure within the data processing system.

Currently, the number of logical partitions (LPARs) that may be created on a partitionable server of the data processing system is bound by the amount of real memory available on that server. That is, if the server has 32 GBs of real memory, once the partitions have been created and have been allocated those 32 GBs of real memory, no further logical partitions can be activated on that server. This places restriction on those configurations where a customer may wish to have, for example, hundreds of logical partitions on one partitionable server.

Partitioned computing platforms have led to challenges to fully utilize available resources in the partitioned server. These resources, such as processor, memory and I/O, are typically assigned to a given partition and are therefore unavailable to other partitions on the same platform. Flexibility may be added by allowing the user to dynamically remove and add resources, however, this requires active user interaction, and can therefore be cumbersome and inconvenient. Also, memory is difficult to fully utilize in this way since there are frequently large amounts of infrequently accessed memory in idle partitions. However, that memory needs to be available to the operating system(s) to handle sudden spikes in workload requirements.

SUMMARY OF THE INVENTION

To address this need, the concept of a shared memory partition has been created. A shared memory partition's memory is backed by a pool of physical memory in the server that is shared by other shared memory partitions on that server. The amount of physical memory in the pool will typically be smaller than the sum of the logical memory assigned to all of the shared memory partitions in the pool to allow the memory to be more fully utilized. Idle and/or less active logical memory in the shared partitions that does not fit in the physical memory pool is paged out by the hypervisor to a cheaper and more abundant form of storage via an entity external to the hypervisor known as a paging service partition.

In response to a hypervisor page fault for memory that is not resident in the shared memory pool (i.e., the physical memory pool), an I/O paging request is taken from a pool of free I/O paging requests and sent via the paging service partition to the external storage entity of the data processing system to request the needed page. The partition's virtual processor encountering the hypervisor page fault is then placed into a wait state. The wait state blocks further execution of the virtual processor until the I/O paging request is satisfied, or if the hypervisor page fault occurred while external interrupts were enabled for the virtual processor, until an external or timer interrupt occurs. If the virtual processor is woken up by an external or timer interrupt while the original hypervisor page fault is outstanding, it may either encounter an additional hypervisor page fault on a different address, or handle the interrupt and return to a different code location with interrupts enabled and encounter another hypervisor page fault, thus consuming additional I/O paging requests. There are also non-maskable interrupts that can always wake up a virtual processor that is waiting on an outstanding I/O paging request responsive to a hypervisor page fault, possibly resulting in another hypervisor page fault and the consumption of another I/O paging request. These types of scenarios result in cases where multiple hypervisor page faults can occur for a given virtual processor when there are no free input/output paging requests available to create a page-in request in response to the hypervisor page fault.

Provided herein, therefore, is an enhanced method for processing hypervisor page faults in a shared memory partition data processing system. The method includes: responsive to an executing virtual processor encountering a hypervisor page fault, allocating an input/output (I/O) paging request to the virtual processor from an I/O paging request pool and incrementing an outstanding I/O paging request count for the virtual processor; and determining whether the outstanding I/O paging request count for the virtual processor is at a predefined threshold, and if not, placing the virtual processor in a wait state with interrupt wake-up reasons enabled based on the virtual processor's state, and if the outstanding I/O paging request count for the virtual processor is at the predefined threshold, then placing the virtual processor in a wait state with interrupt wake-up reasons disabled.

In another aspect, a shared memory partition data processing system is provided. The shared memory partition data processing system includes a physical memory comprising a shared memory pool for one or more shared memory partitions of the data processing system, and a processor supporting a plurality of virtual processors of the one or more shared memory partitions. The one or more shared memory partitions share at least one portion of the shared memory pool of the physical memory of the data processing system, and interface therewith through a hypervisor memory manager. The hypervisor memory manager facilitates allocating, responsive to an executing virtual processor encountering a hypervisor page fault, an input/output (I/O) paging request to the virtual processor from an I/O paging request pool, and determining whether an outstanding I/O paging request count of the virtual processor is at a predefined threshold, and if not, placing the virtual processor in a wait state with interrupt wake-up reasons enabled based on the virtual processor's state, otherwise, placing the virtual processor in a wait state with interrupt wake-up reasons disabled.

In a further aspect, the invention comprises an article of manufacture which includes at least one computer-readable medium having computer-readable program code logic to address a hypervisor page fault in a shared memory partition data processing system. The computer-readable program code logic when executing on a processor performing: responsive to an executing virtual processor encountering a hypervisor page fault, allocating of an input/output (I/O) paging request to the virtual processor from an I/O paging request pool and incrementing an outstanding I/O paging request count for the virtual processor; and determining whether the outstanding I/O paging request count for the virtual processor is at a predefined threshold, and if not, placing the virtual processor in a wait state with interrupt wake-up reasons enabled based on the virtual processor's state, and if the outstanding I/O paging request count for the virtual processor is at the predefined threshold, then placing the virtual processor in a wait state with interrupt wake-up reasons disabled.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
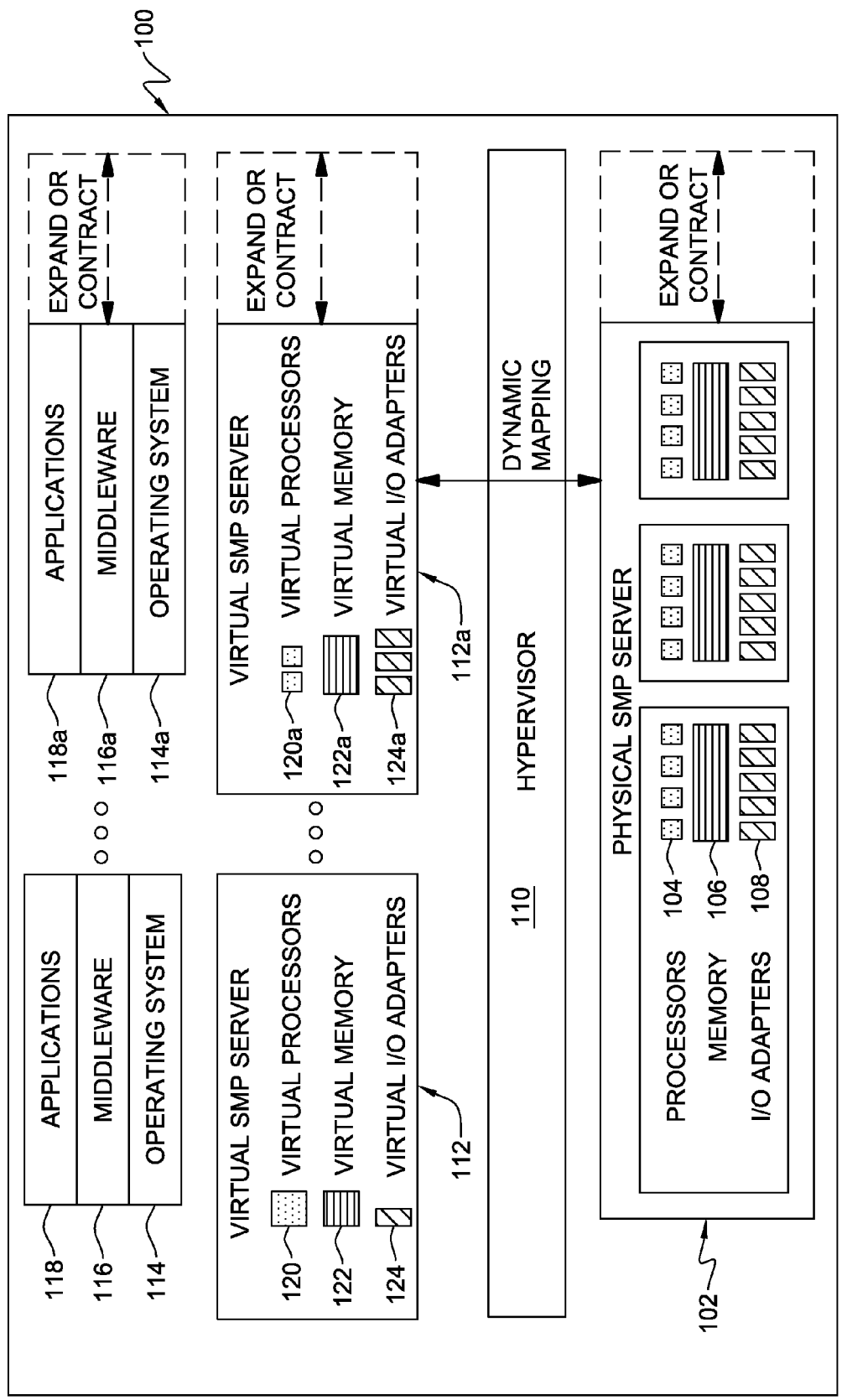
FIG. 1 is a block diagram of one embodiment of a data processing system to implement one or more aspects of the present invention.

FIG. 1 is a block diagram of a data processing system 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processor 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by a hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
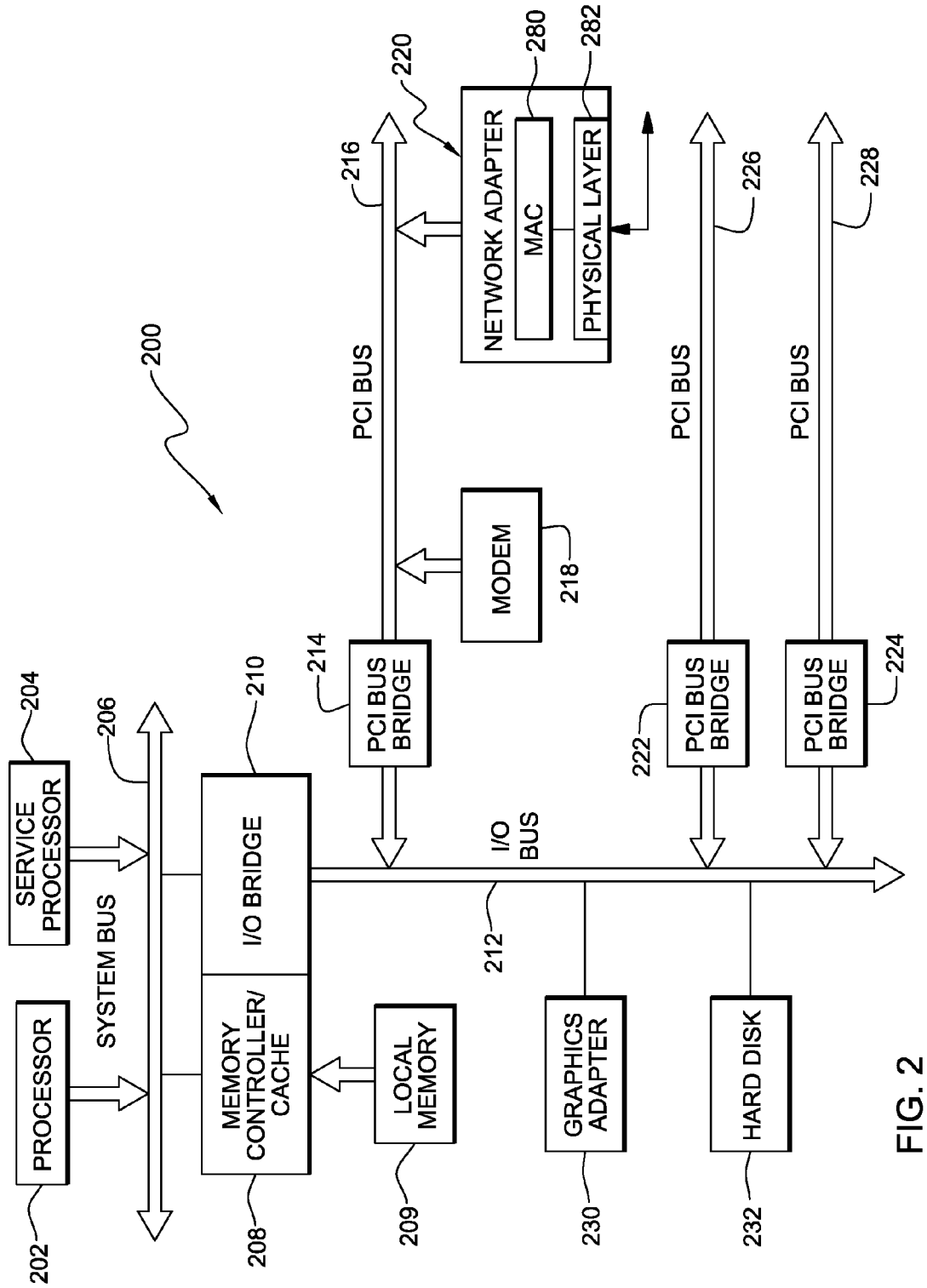
FIG. 2 is a more detailed illustration of a data processing system which could be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, a shared memory partition data processing system implementing hypervisor-managed paging such as described hereinbelow can be built upon technologies found in IBM's p/i Series product line firmware and systemware, as described in the "Power Architecture Platform Reference" (PAPR) material at Power.org (http://www.power.org/members/developers/specs/PAPR_Version_2.7_09Oct07.pdf), which is hereby incorporated herein by reference. In addition, a virtual input/output server (VIOS) is commercially available as part of a PowerVM computing system offered by International Business Machines Corporation. The VIOS allows sharing of physical resources between logical partitions, including virtual SCSI and virtual networking. This allows more efficient utilization of physical resources through sharing between logical partitions and facilitates server consolidation. (IBM, pSeries, iSeries and PowerVM are registered trademarks of International Business Machines Corporation, Armonk, N.Y., U.S.A. Other names used herein may be registered trademarks, trademarks, or product names of International Business Machines Corporation or other companies.)

Figure 3:
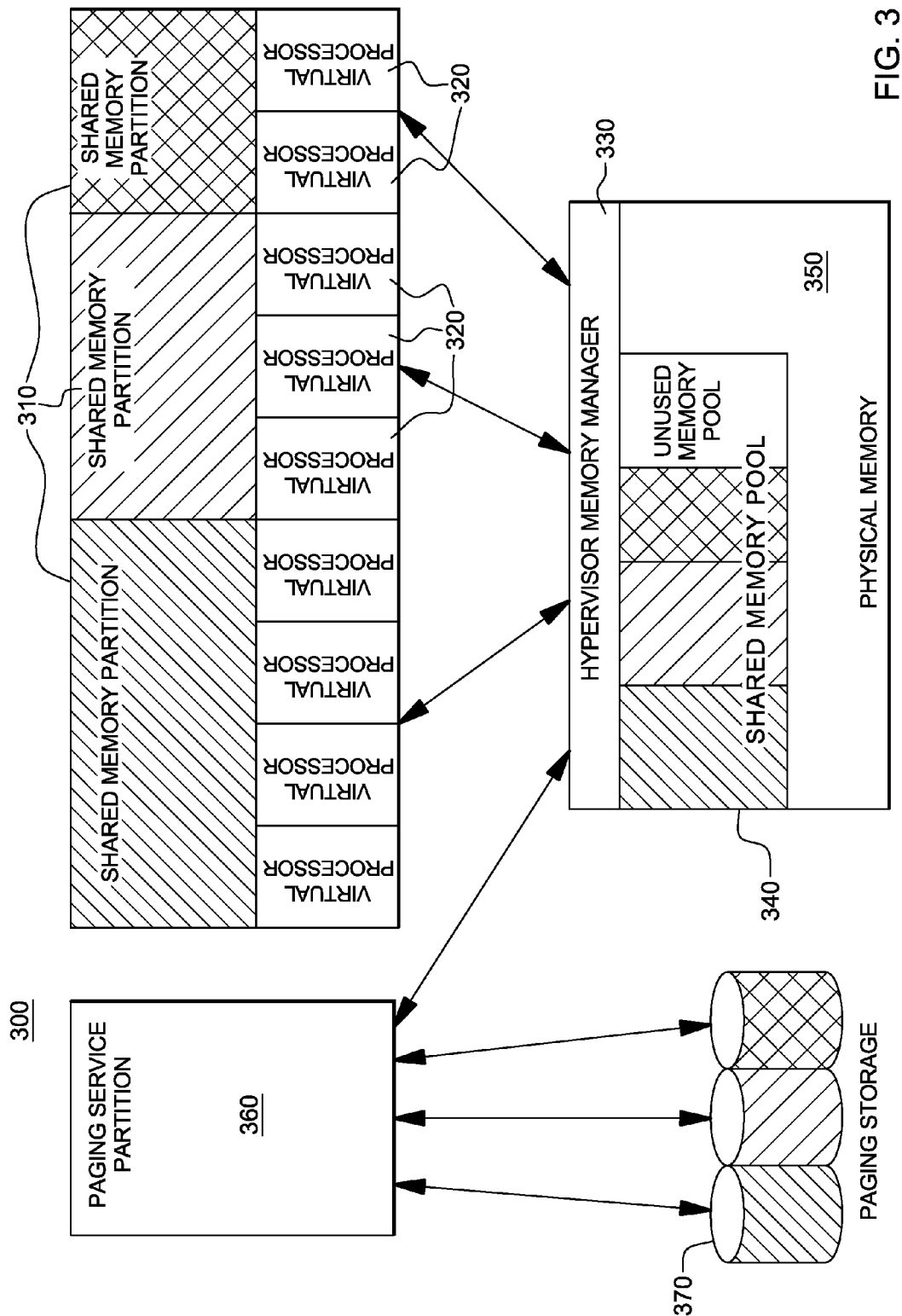
FIG. 3 illustrates one embodiment of a data processing system comprising multiple shared memory partitions employing a common (or shared) memory pool within physical memory of the data processing system, in accordance with an aspect of the present invention.

As noted, partition computing platforms have presented challenges to fully utilize available resources in the partitioned server. One approach to achieving this goal has been the creation of a shared memory partition data processing system, generally denoted 300, such as depicted in FIG. 3. As illustrated, the shared memory partition data processing system 300 includes one or more shared memory partitions 310, each of which comprises one or more virtual processors 320, which interface through a hypervisor, and more particularly, a hypervisor memory manager 330, to a shared memory pool 340 within physical memory 350 of the shared memory partition data processing system 300. The amount of physical memory in the pool is typically smaller than the sum of the logical memory assigned to all of the shared memory partitions 310 utilizing the shared memory pool to allow the memory to be more fully employed. Idle and/or less active logical memory of one or more shared memory partitions that does not fit in the shared memory pool 340 is paged out by the hypervisor to a more abundant, less expensive storage (such as disk storage), via a paging service partition 360. Paging service partition 360 is an enhanced virtual input/output service (VIOS) partition configured to facilitate paging-out and paging-in of memory pages from or to, respectively, the shared memory pool. Also, although referred to as a shared memory partition, in reality, there is no sharing of memory per se, but rather sharing of the availability of a set amount of physical memory in the pool.

Figure 4:
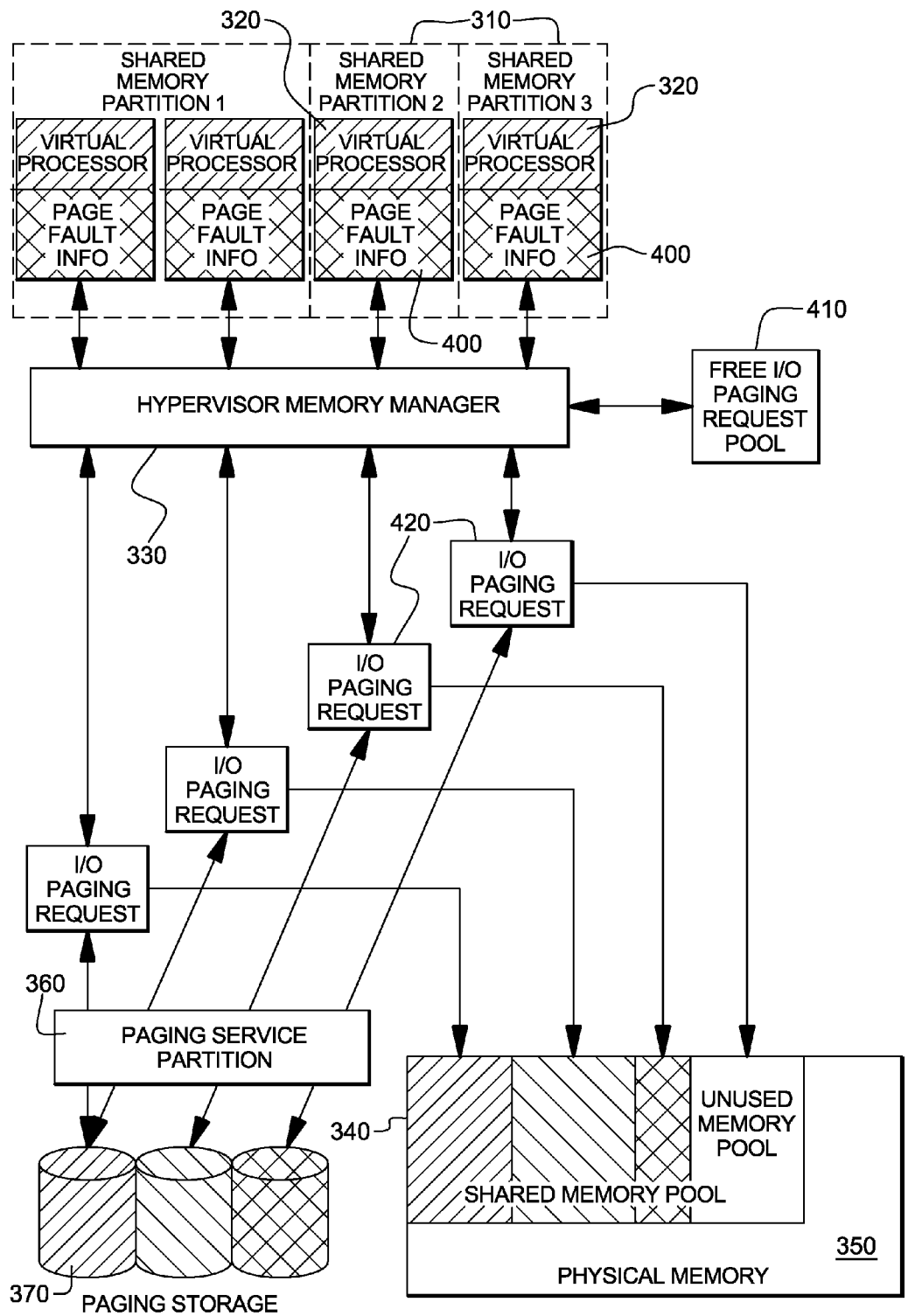
FIG. 4 illustrates one embodiment of handling hypervisor page faults within a shared memory partition data processing system, such as depicted in FIG. 3, in accordance with an aspect of the present invention.

FIG. 4 illustrates one operational embodiment of handling hypervisor page faults within a shared memory partition data processing system such as described above in connection with FIG. 3. In this embodiment, three shared memory partitions 310, i.e., shared memory partition 1, shared memory partition 2 & shared memory partition 3, are illustrated, each comprising one or more virtual processors 320, and each encountering a hypervisor page fault 400. Each hypervisor page fault is responsive to a request by a virtual processor 320 for memory that is not resident in the shared memory pool 340 of physical memory 350. Responsive to this, the hypervisor memory manager 330 takes an I/O paging request 420 from a free I/O paging request pool 410 and sends, via the paging service partition 360, the I/O paging request to the external storage entity 370 to request the needed page. Concurrent with requesting the needed page, the partition's virtual processor encountering the hypervisor page fault is placed into a wait state. As explained further below, logic is provided herein for handling starvation of I/O paging requests needed to service page-in requests to the external storage entity responsive to hypervisor page faults encountered by one or more virtual processors of one or more shared memory partitions of the shared memory partition data processing system.

Figure 5:
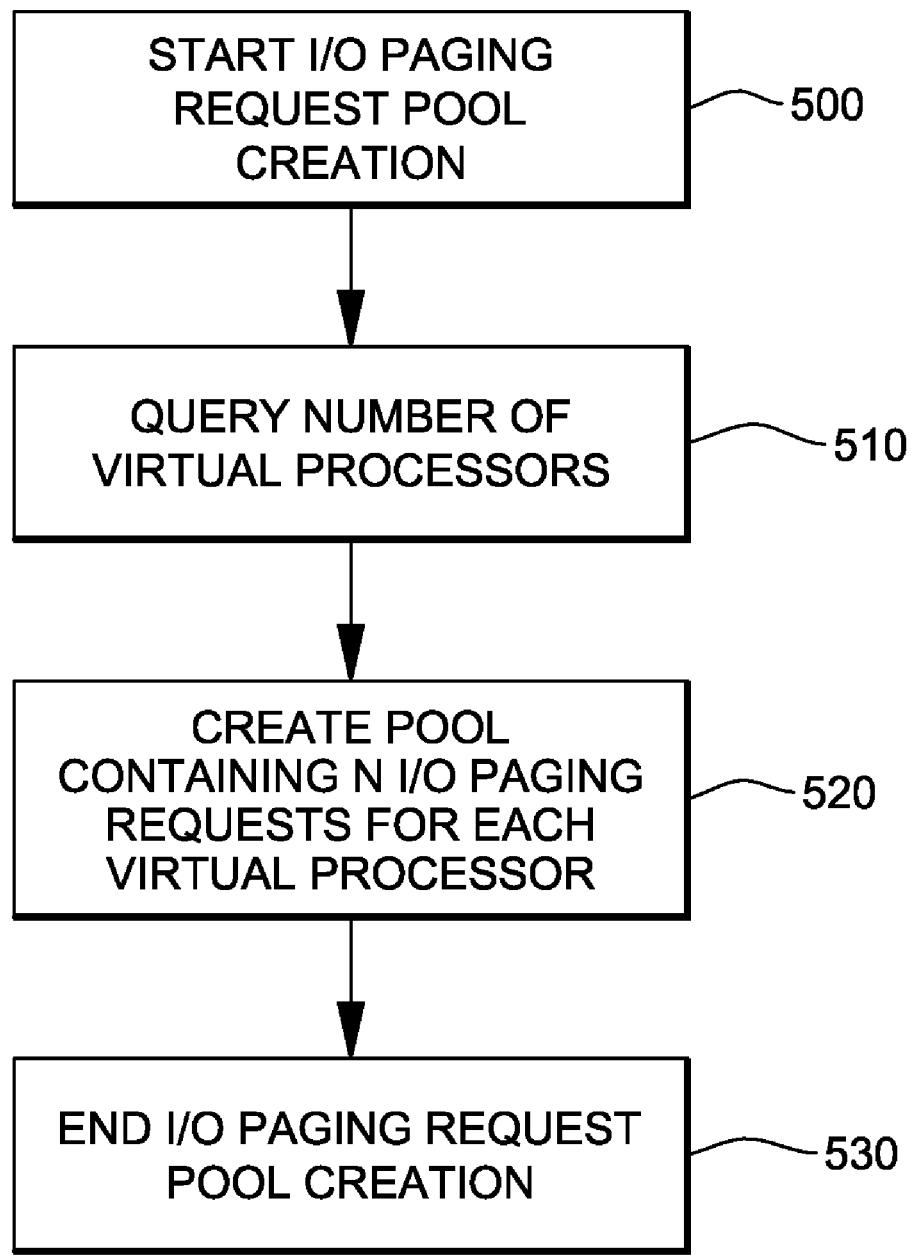
FIG. 5 depicts one embodiment of logic for creating an I/O paging request pool for use in handling hypervisor page faults, in accordance with an aspect of the present invention.

FIG. 5 illustrates one embodiment of logic for creating an I/O paging request pool for use by the hypervisor memory manager. The logic begins the I/O paging request pool creation 500 by querying for the number of virtual processors in the shared memory partition data processing system 510. After the number of processors are established, N I/O paging requests for each virtual processor are assigned and added to the I/O paging request pool. In one embodiment, an I/O paging request is an I/O request control block used by the hypervisor and paging service partition in requesting page-in of a memory page previously paged-out to the external paging storage from the server's physical memory.

Figure 6:
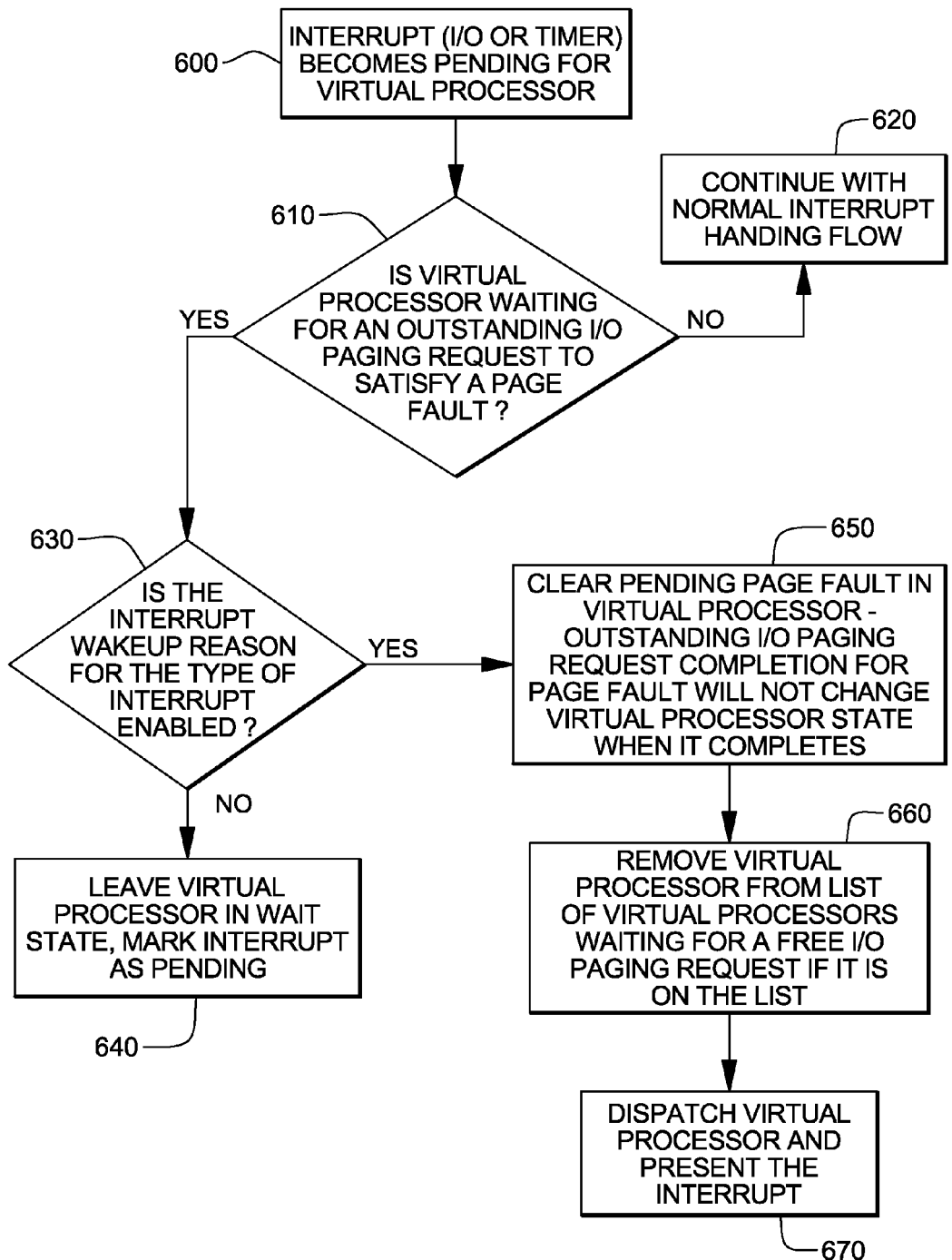
FIG. 6 depicts one embodiment of logic for processing virtual processor interrupts in a shared memory partition data processing system, in accordance with an aspect of the present invention.

FIG. 6 depicts one embodiment of interrupt logic for processing virtual processor interrupts in a shared memory partition data processing system. Initially, an interrupt, such as an input/output interrupt or a timer interrupt, becomes pending for a virtual processor 600. The logic determines whether the virtual processor is waiting for an outstanding I/O paging request to satisfy a hypervisor page fault 610, and if not, continues with normal interrupt handling logic flow 620. If the virtual processor receiving the interrupt is currently waiting for an outstanding I/O paging request to be satisfied, then the logic determines whether the virtual processor's interrupt wake-up reasons for the type of interrupt received is enabled 630. If "no", then the logic leaves the virtual processor in the wait state, marking the interrupt as pending 640.

If the interrupt wake-up reason is enabled for the type of interrupt received, then the logic clears the pending page fault in the virtual processor so that completion of the outstanding I/O paging request for the hypervisor page fault will not change the virtual processor's state 650. Next, if a list of virtual processors waiting for a free I/O paging request is employed, and the waiting virtual processor is on the list, then the logic removes the virtual processor from the list of virtual processors waiting for a free I/O paging request 660, and dispatches the virtual processor and presents the interrupt 670.

Figure 7A:
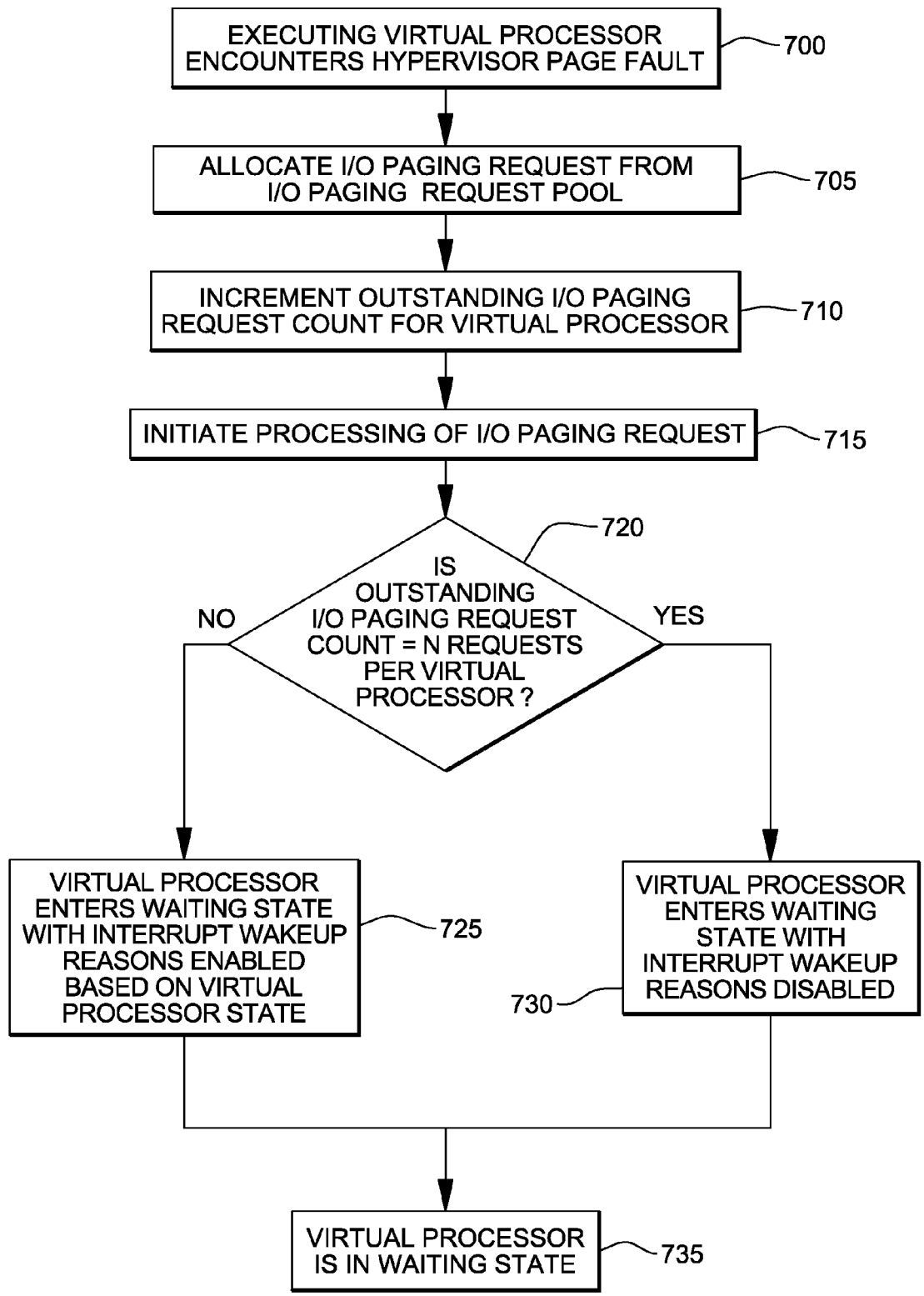
FIGS. 7A & 7B depict one embodiment of logic for addressing a hypervisor page fault in a shared memory partition data processing system, in accordance with an aspect of the present invention.
Figure 7B:
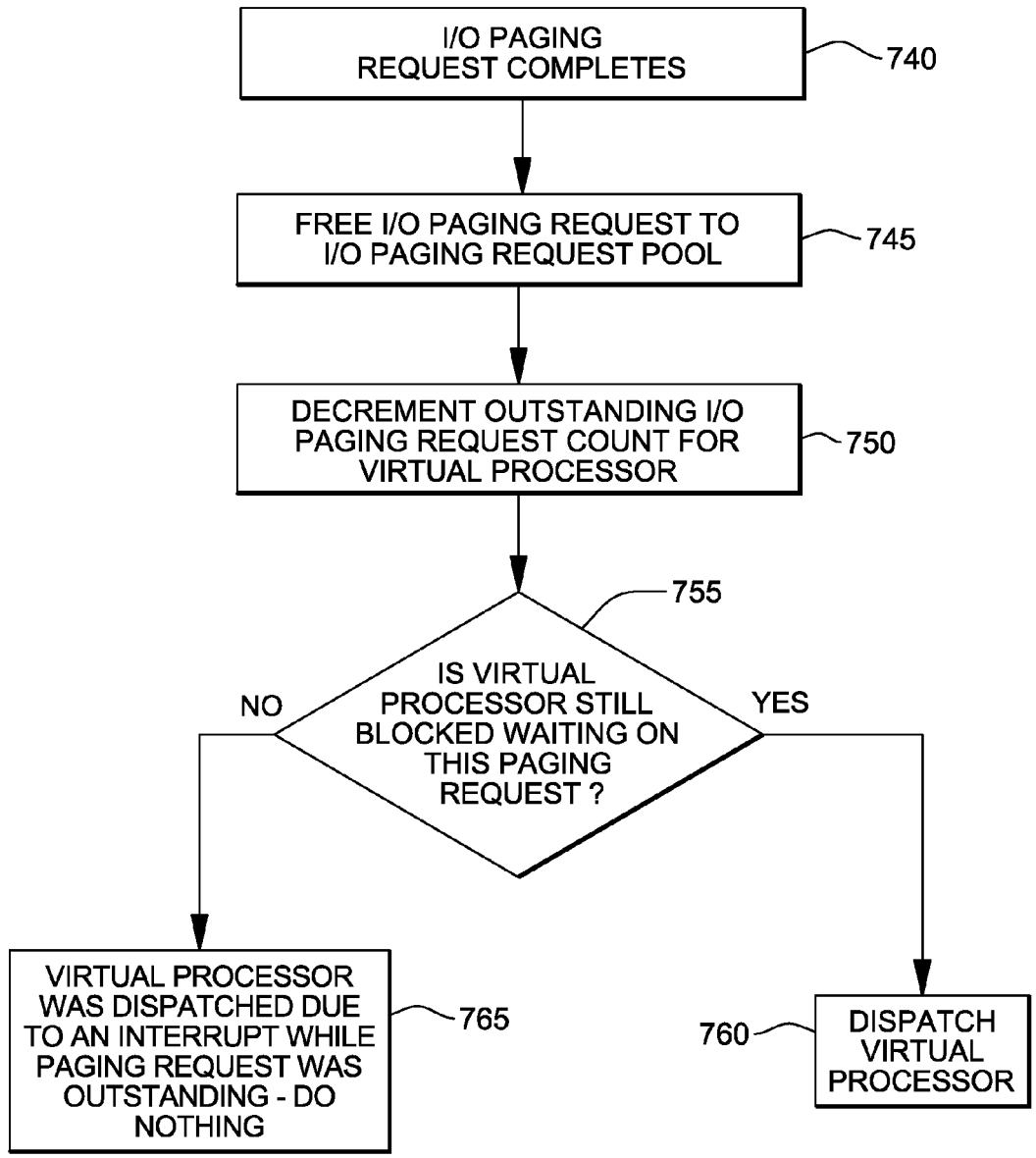

FIGS. 7A & 7B depict one embodiment of logic for processing a hypervisor page fault, in accordance with an aspect of the present invention. In this approach, the I/O paging request pool is sized such that it contains some number (N) of available I/O paging requests for each virtual processor that is present in the shared memory pool. When a virtual processor encounters a hypervisor page fault that results in an I/O paging request being used, a count is incremented (e.g., in the virtual processor or in the hypervisor memory manager) to track the number of outstanding I/O paging requests that it is employing. When the I/O paging request is satisfied, the virtual processor's count is decremented. If a page fault is encountered which bumps the outstanding request count to N, then the virtual processor is placed in a special faulted state that blocks all possible execution of that virtual processor. This prevents the virtual processor from waking up and encountering a new page fault for which there may not be a free I/O paging request. This approach advantageously limits the number of I/O requests that each virtual processor can consume for its own purposes.

Referring to the logic of FIGS. 7A & 7B, an executing virtual processor encounters a hypervisor page fault 700 and is initially allocated an I/O paging request from the I/O paging request pool by the hypervisor memory manager 705. The outstanding I/O paging request count for the executing virtual processor is incremented 710, and the logic initiates processing of the I/O paging request 715 by sending the I/O paging request to the paging service partition of the shared memory partition data processing system to request page-in of the requested page. Logic next determines whether the outstanding I/O paging request count is at N for the virtual processor 720. If "no", then the virtual processor enters a waiting state with interrupt wake-up reasons enabled based on the virtual processor's state. Otherwise, the virtual processor enters a waiting state with its interrupt wake-up reasons disabled 730. "Interrupt wake-up reasons" refers to whether the machine state register of the execution state of the virtual processor has external exceptions enabled or not. Thus, a virtual processor entering a waiting state with interrupt wake-up reasons enabled based on the virtual processor's state means with external interrupt wake-ups enabled based on the virtual processor's execution state. The virtual processor remains in the waiting state 735 until paging of the I/O paging request completes (see FIG. 7B). The free I/O paging request is returned to the I/O paging request pool 745 and the outstanding I/O paging request count for the virtual processor is decremented 750. Logic then determines whether the virtual processor is still blocked waiting on the just completed I/O paging request 755, and if "yes", dispatches the virtual processor 760. If the virtual processor is not blocked waiting on the completed paging request, then the virtual processor was previously dispatched due to an interrupt while the I/O paging request was outstanding, and no further action is necessary 765.

Figure 8A:
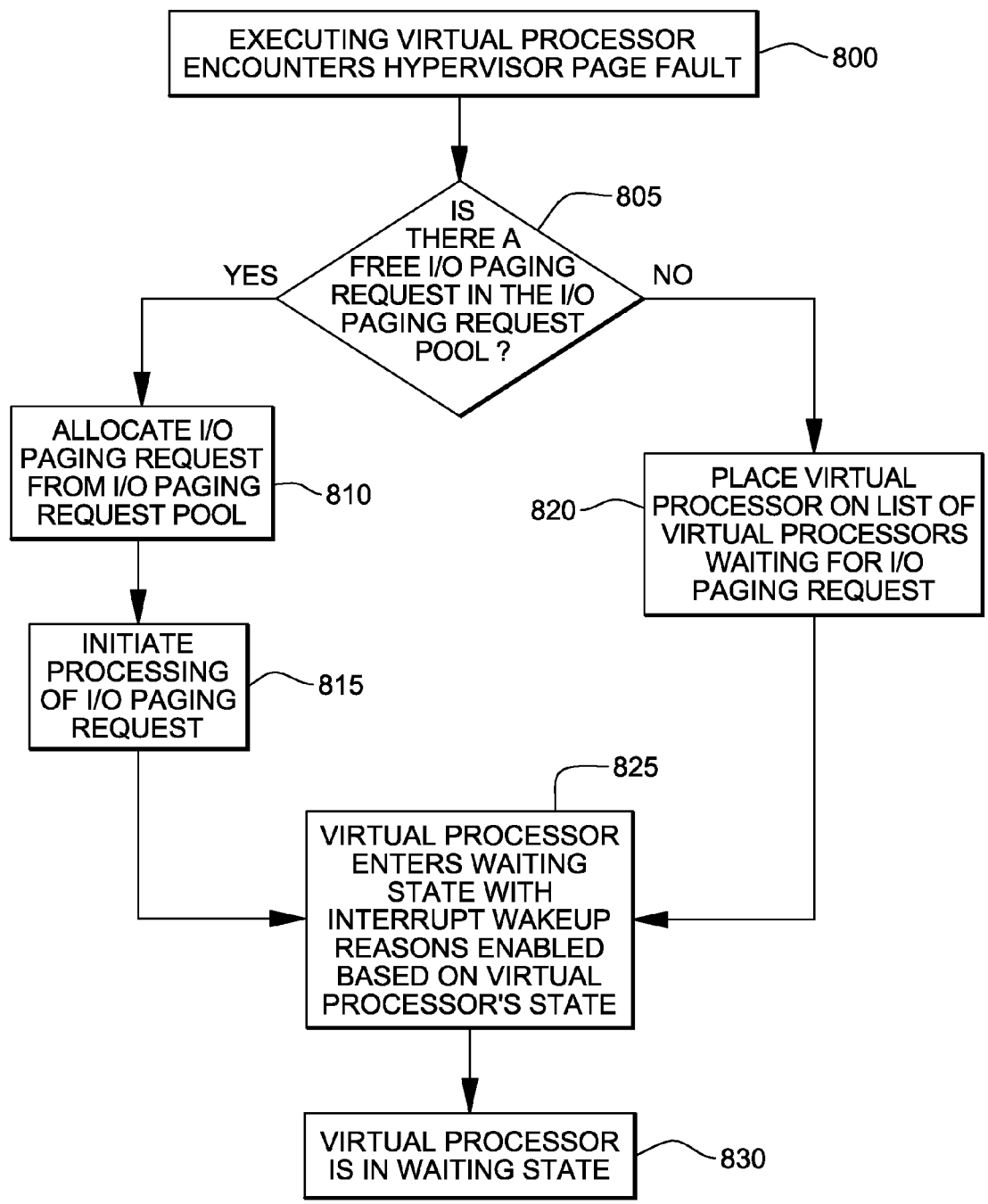
FIGS. 8A & 8B depict an alternate embodiment of logic for addressing a hypervisor page fault in a shared memory partition data processing system, in accordance with an aspect of the present invention.
Figure 8B:
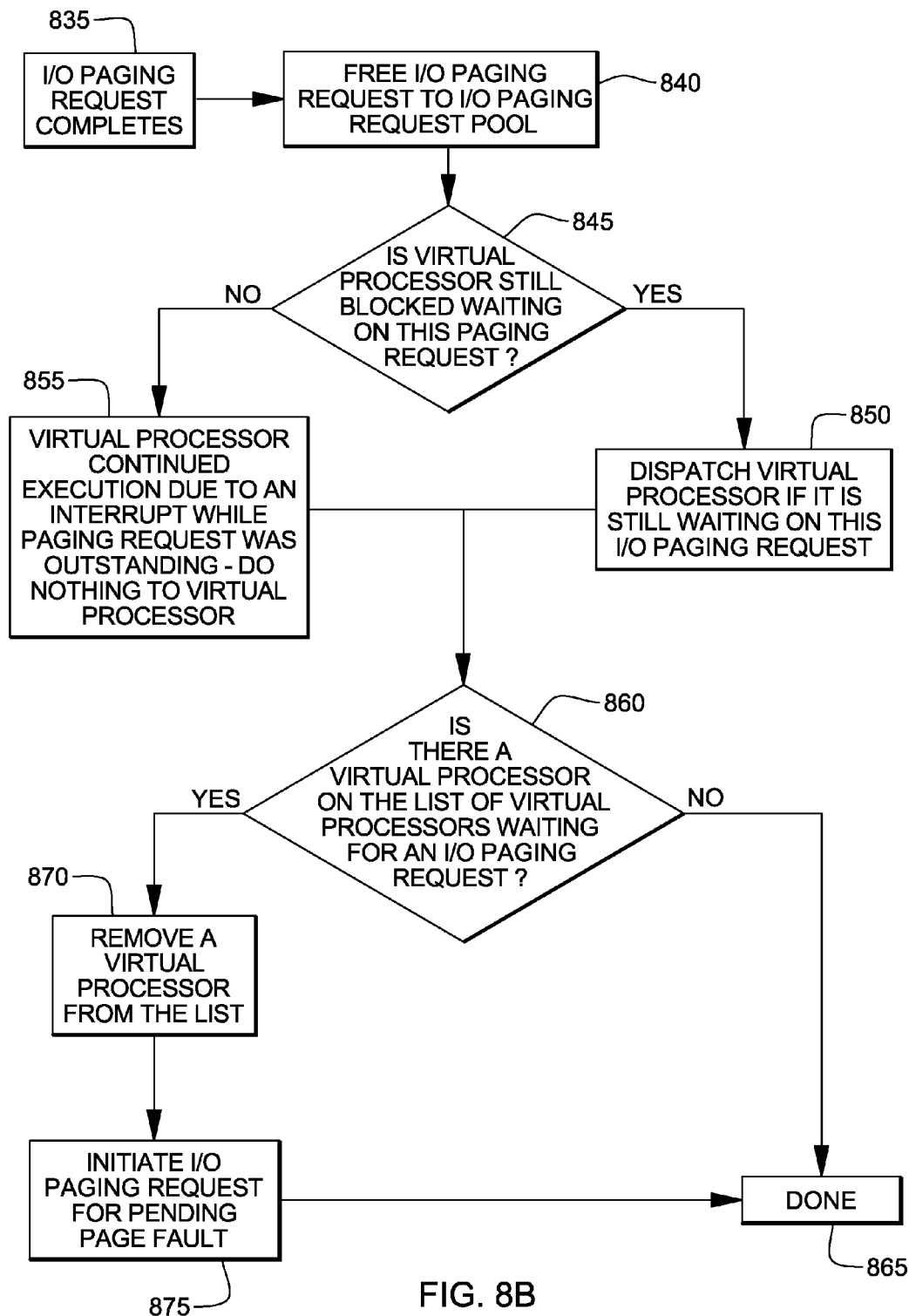

As noted, the above-described approach advantageously limits the number of I/O paging requests that each virtual processor can consume for its own purposes to a predefined number N. However, this may result in a virtual processor being unnecessarily blocked, while there are still free I/O paging requests available in the I/O paging request pool. FIGS. 8A & 8B depict an alternative logic approach for processing hypervisor page faults in a shared memory partition data processing system. In this approach, when a virtual processor encounters a hypervisor page fault that needs to generate a page-in request and there are no I/O paging requests available in the I/O paging request pool, then the virtual processor is placed in a suspended, waiting for I/O paging request state that blocks any further execution of the virtual processor. The hypervisor memory manager keeps track of the virtual processors that are in this special state and notifies them to retry their page in request when a free I/O paging request becomes available. This approach has the advantage of only completely blocking execution of a virtual processor when the pool of free I/O paging requests is empty.

Referring first to FIG. 8A, responsive to an executing virtual processor encountering a hypervisor page fault 800, the handling logic determines whether there are any free I/O paging requests in the I/O paging request pool 805. If "yes", then an I/O paging request is allocated to the virtual processor from the I/O paging request pool 810, processing of the I/O paging request is initiated 815, and the virtual processor enters a waiting state with interrupt wake-up reasons enabled based on the virtual processor's state 825. If there is no free I/O paging request available in the I/O paging request pool, then the virtual processor is placed on a list of virtual processors waiting for a free I/O paging request 820, before entering the waiting state with interrupt wake-up reasons enabled based on the virtual processor's state 825. The virtual processor remains in the waiting state 830 until an I/O paging request completes 835 (FIG. 8B).

Once an I/O paging request completes, the I/O paging request is freed to the I/O paging request pool 840 and the handling logic determines whether the virtual processor is still blocked waiting on this paging request that was just freed 845. If "yes", then the virtual processor is dispatched 850. Otherwise, the virtual processor continued execution due to an interrupt while the paging request was outstanding, and no action is necessary 855. The handling logic then determines whether there is a virtual processor on the list of virtual processors waiting for a free I/O paging request 860, and if not, processing is complete 865. If "yes", then a virtual processor is removed from the list of virtual processors awaiting an I/O paging request 870, and an I/O paging request is initiated for the pending hypervisor page fault for that virtual processor 875. Once hypervisor page faults for all virtual processors have been completed, then processing is finished 865.

As an enhanced handling approach, the approaches of FIGS. 7A-8B may be combined into a single process. Specifically, the approach of FIGS. 7A & 7B can be implemented such that each virtual processor is allowed N I/O paging requests as described above, plus M additional I/O paging requests before its execution is completely blocked until the I/O paging requests that it created start freeing up. M is an arbitrary number of a few additional I/O paging requests that the virtual processor is allowed to use that would normally be guaranteed to be available to other virtual processors. This allows better overall utilization of the I/O paging request pool, but would still allow for rare cases where the pool could still become completely starved. If complete starvation were to occur, then the approach of FIGS. 8A & 8B would take over. The tuning of M can be adjusted to achieve good performance in these starvation cases, and may even be self-adjusted by the hypervisor memory manager. If the approach of FIGS. 8A & 8B is engaged at a frequent rate, M can be dynamically adjusted downward to reduce the number of I/O paging requests that a single virtual processor can consume, and therefore, reduce the number of virtual processors that encounter no free I/O paging request before reaching their N+M limit. If the method of FIGS. 8A & 8B is not being engaged or being engaged infrequently, and the method of FIGS. 7A & 7B is being engaged frequently, then M can be dynamically increased to allow individual virtual processors to consume more I/O paging requests and make execution progress more efficient.

Figure 9A:
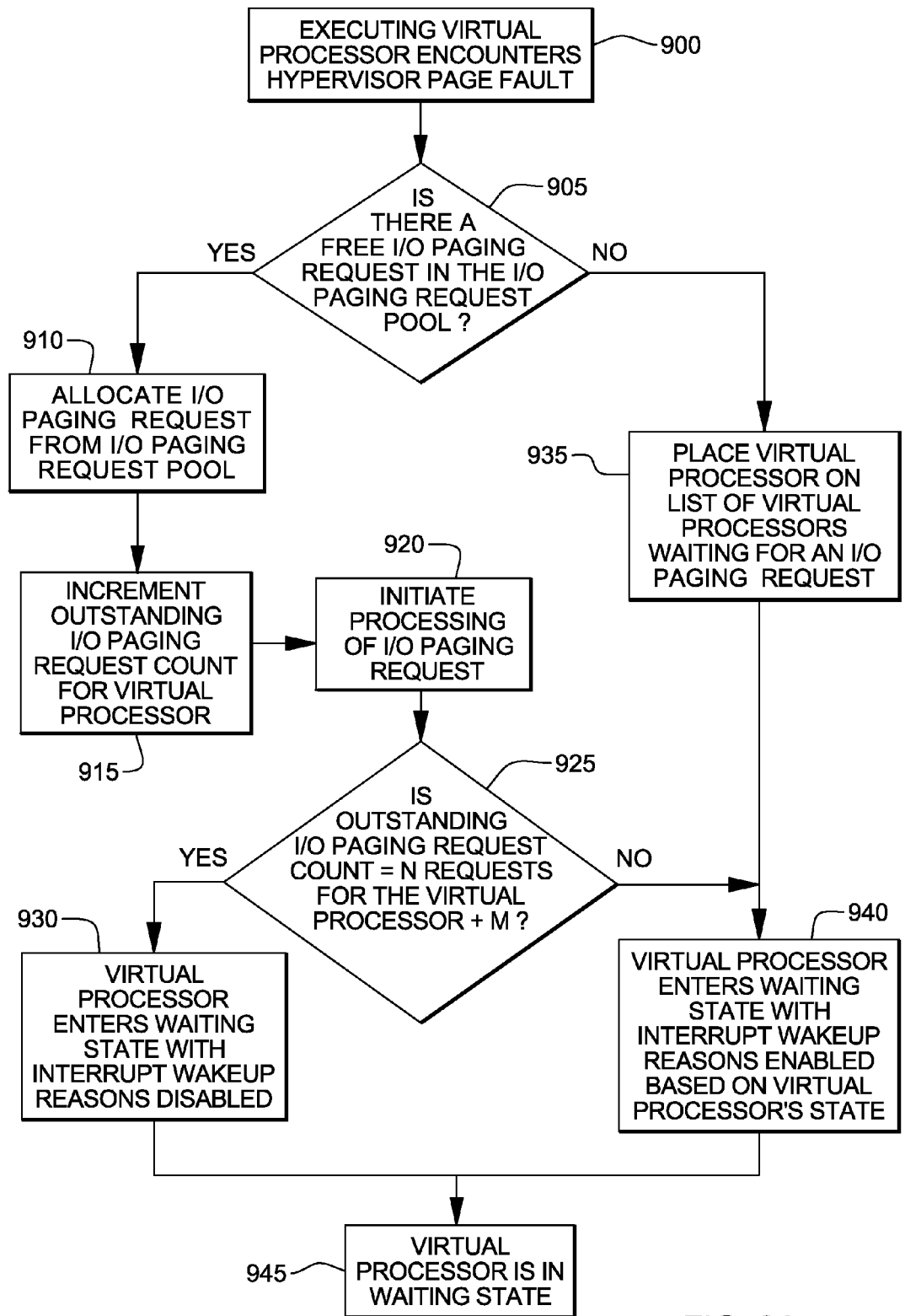
FIGS. 9A & 9B depict a further embodiment of logic for addressing a hypervisor page fault in a shared memory partition data processing system, in accordance with an aspect of the present invention.
Figure 9B:
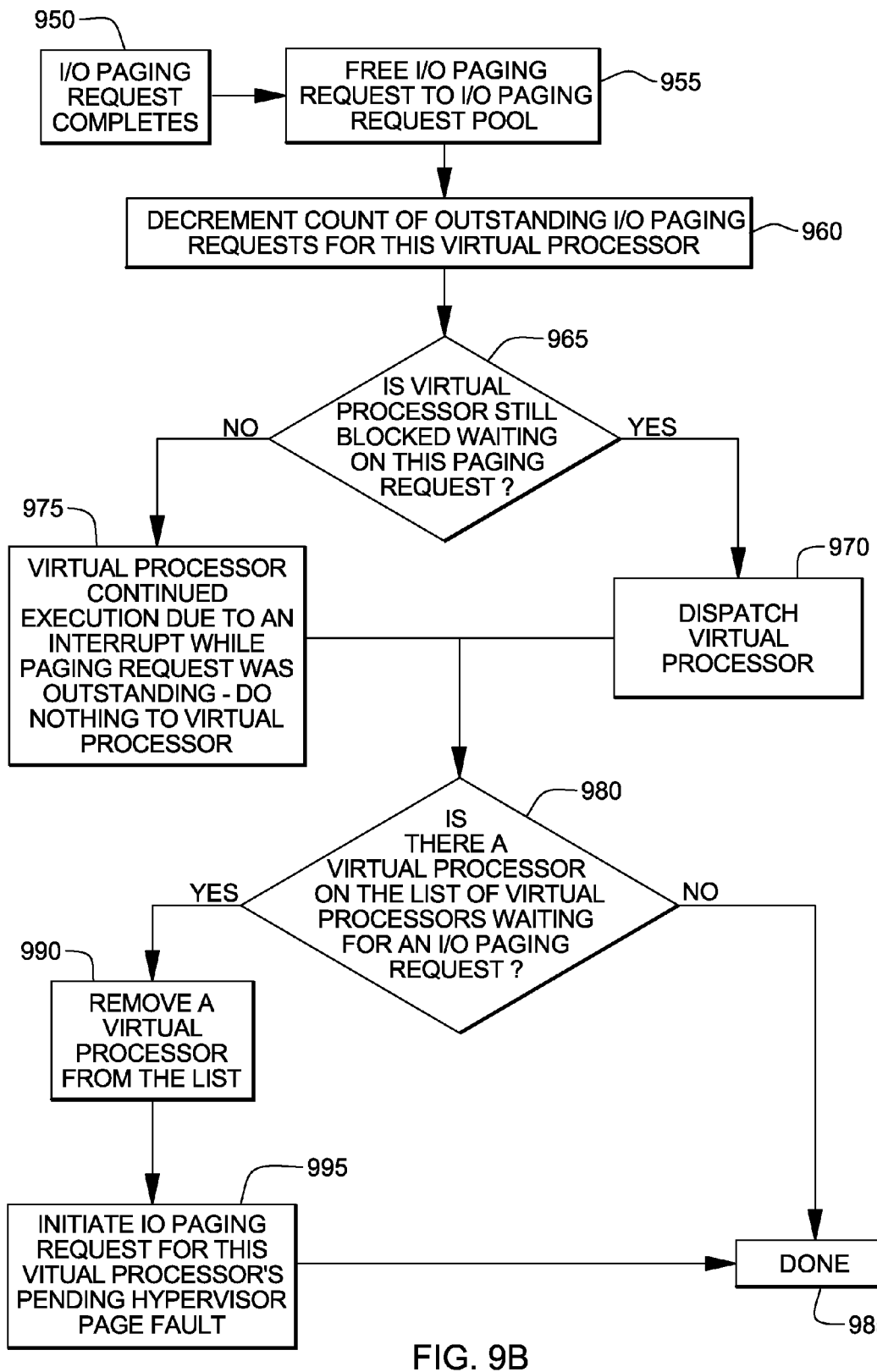

FIGS. 9A & 9B depict a further embodiment of handling logic for processing a hypervisor page fault in a shared memory data processing system. In the handling logic of these figures, the approach of FIGS. 7A & 7B is merged with the approach of FIGS. 8A & 8B.

Referring first to FIG. 9A, an executing virtual processor encounters a hypervisor page fault 900 and the handling logic determines whether there is a free I/O paging request in the I/O paging request pool 905. If "yes", then an I/O paging request is allocated from the I/O paging request pool 910, the outstanding I/O paging request count for the virtual processor is incremented 915 and processing of the I/O paging request is initiated 920. The handling logic then determines whether the outstanding I/O paging request count is at N requests for the virtual processor at issue, plus M, wherein M is a defined tuning number which allows the virtual processor to exceed the predefined N I/O paging requests at a given time when necessary 925. If the count is at N+M, then the virtual processor enters the waiting state with the interrupt wake-up reasons disabled 930.

If there is no free I/O paging request in the I/O paging request pool, then from inquiry 905, the handling logic places the virtual processor on a list of virtual processors waiting for a free I/O paging request 935, and the virtual processor enters a waiting state with interrupt wake-up reasons enabled based on the virtual processor's state 940.

The virtual processor remains in the waiting state 945 until the I/O paging request completes 950 (see FIG. 9B). Upon completing an I/O paging request, the just-freed I/O paging request is added to the I/O paging request pool 955 and the count of the outstanding I/O paging request for the virtual processor employing that paging request is decremented 960. The handling logic determines whether the virtual processor having the completed I/O paging request is still blocked waiting on this paging request 965, and if "yes", dispatches the virtual processor 970. Otherwise, the virtual processor continues execution due to an earlier interrupt while the I/O paging request was outstanding, that is, no action is necessary with respect to the virtual processor 975. The handling logic then determines whether there is a virtual processor on the list of virtual processors waiting for a free I/O paging request 980, and if "no", processing is complete 985. Otherwise, a next virtual processor on the list of virtual processors awaiting a free I/O paging request is obtained 990, and the I/O paging request is initiated for that virtual processor's pending page fault 955.

Further details on shared memory partition data processing systems are provided in the following, co-filed patent applications, the entirety of each of which is hereby incorporated herein by reference: "Hypervisor-Based Facility for Communicating Between a Hardware Management Console and a Logical Partition", U.S. Ser. No. 12/403,402; "Managing Assignment of Partition Services to Virtual Input/Output Adapters", U.S. Ser. No. 12/403,416; "Automated Paging Device Management in a Shared Memory Partition Data Processing System", U.S. Ser. No. 12/403,426; "Dynamic Control of Partition Memory Affinity in a Shared Memory Partition Data Processing System", U.S. Ser. No. 12/403,440; "Transparent Hypervisor Pinning of Critical Memory Areas in a Shared Memory Partition Data Processing System", U.S. Ser. No. 12/403,447; "Shared Memory Partition Data Processing System with Hypervisor Managed Paging", U.S. Ser. No. 12/403,459; "Controlled Shut-Down of Partitions Within a Shared Memory Partition Data Processing System", U.S. Ser. No. 12/403,472; and "Managing Migration of a Shared Memory Logical Partition From a Source System to a Target System", U.S. Ser. No. 12/403,485.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 10:
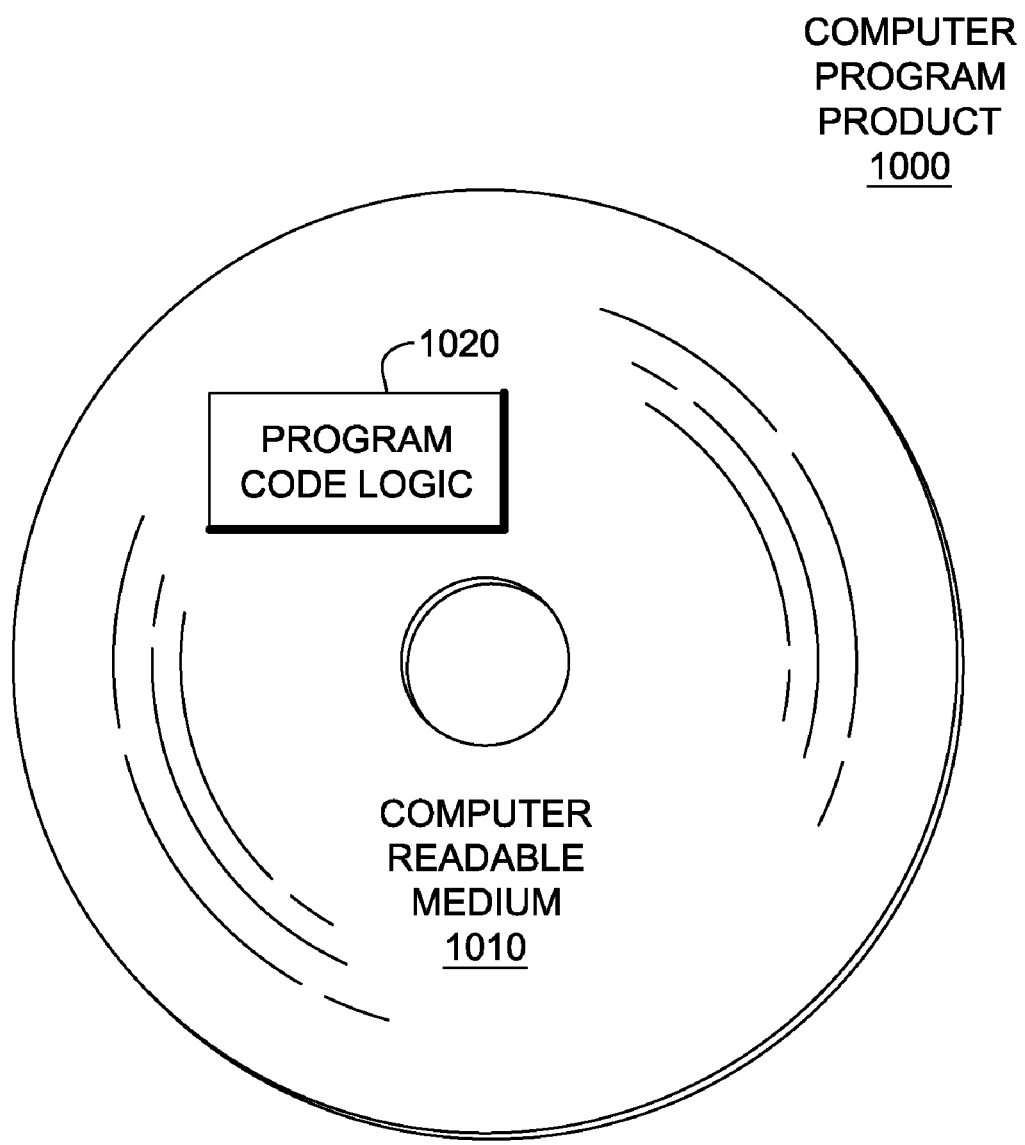
FIG. 10 depicts one embodiment of a computer program product incorporating one or more aspects of the present invention.

One example of an article of manufacture or a computer program product incorporating one or more aspects of the present invention is described with reference to FIG. 10. A computer program product 1000 includes, for instance, one or more computer readable medium 1010 to store computer readable program code means or logic 1020 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although various embodiments are described above, these are only examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of addressing a hypervisor page fault in a shared memory partition data processing system, the method comprising:
    determining whether an outstanding input/output (I/O) paging request count of I/O paging requests for an executing virtual processor is at a predefined threshold; and
    performing any of:
        based on the outstanding I/O paging request count for the virtual processor being below the defined threshold, placing the virtual processor in a wait state with interrupt wake-up reasons enabled based on the virtual processor's state, and
        based on the outstanding I/O paging request count for the virtual processor being at the predefined threshold, then placing the virtual processor in a wait state with interrupt wake-up reasons disabled.

2. The method of claim 1, further comprising pre-assigning N I/O paging requests per virtual processor of a plurality of virtual processors of the shared memory partition data processing system, wherein N is the predefined threshold.

3. The method of claim 2, further comprising, responsive to completing one I/O paging request, freeing the one I/O paging request to an I/O paging request pool, decrementing the outstanding I/O paging request count for the virtual processor, and determining whether the virtual processor is still blocked waiting on the one completed I/O paging request, and if so, dispatching the virtual processor.

4. The method of claim 1, further comprising, responsive to the executing virtual processor encountering a page fault, allocating an input/output (I/O) paging request to the virtual processor from an I/O paging request pool and incrementing the outstanding I/O paging request count for the virtual processor, and prior to the allocating, determining whether there is a free I/O paging request in the I/O paging request pool, the I/O paging request pool being maintained by a hypervisor of the shared memory partition data processing system, and if so, allocating the free I/O paging request from the I/O paging request pool to the executing virtual processor encountering the hypervisor page fault, otherwise, placing the virtual processor on a list of virtual processors waiting for a free I/O paging request, and placing the virtual processor in a wait state with interrupt wake-up reasons enabled based on the virtual processor's state.

5. The method of claim 4, further comprising, responsive to freeing of an I/O paging request to the I/O paging request pool, determining whether the virtual processor is still blocked waiting on the freed I/O paging request, and if so, dispatching the virtual processor, otherwise allowing the virtual processor to continue execution responsive to a prior interrupt while the freed I/O paging request was outstanding.

6. The method of claim 4, further comprising, responsive to freeing of the I/O paging request to the I/O paging request pool, determining whether there is a virtual processor on the list of virtual processors waiting for an I/O paging request, and if so, removing the virtual processor from the list of virtual processors waiting for an I/O paging request and initiating an I/O paging request for that virtual processor's pending hypervisor page fault.

7. The method of claim 1, further comprising pre-assigning N I/O paging requests to the virtual processor of the shared memory partition data processing system, and wherein the predefined threshold is a number larger than N, wherein when executing, at any point in time, the virtual processor can employ more than N I/O paging requests, notwithstanding the pre-assigning of only N I/O paging requests to the virtual processor.

8. A shared memory partition data processing system comprising:
a physical memory comprising a shared memory pool for at least one shared memory partition of the data processing system, the at least one shared memory partition comprising a plurality of virtual processors;
a processor supporting the plurality of virtual processors, the plurality of virtual processors sharing at least a portion of the shared memory pool of the physical memory of the data processing system; and
wherein the at least one shared memory partition interfaces with the shared memory pool through a hypervisor memory manager, the hypervisor memory manager facilitating determining whether an outstanding input/output (I/O) paging request count of I/O paging requests for the virtual processor is at a predefined threshold; and performing any of:
based on the outstanding I/O paging request count for the virtual processor being below the defined threshold, placing the virtual processor in a wait state with interrupt wake-up reasons enabled based on the virtual processor's state, and
based on the outstanding I/O paging request count for the virtual processor being at the predefined threshold, then placing the virtual processor in a wait state with interrupt wake-up reasons disabled.

9. The shared memory partition data processing system of claim 8, wherein the hypervisor memory manager facilitates pre-assigning of N I/O paging requests per virtual processor of the plurality of virtual processors of the shared memory partition data processing system, wherein N is the predefined threshold.

10. The shared memory partition data processing system of claim 9, wherein the hypervisor memory manager, responsive to completing of one I/O paging request, frees the one I/O paging request to an I/O paging pool, decrements the outstanding I/O paging request count for the virtual processor, and determines whether the virtual processor is still blocked waiting on the one, completed I/O paging request, and if so, dispatches the virtual processor.

11. The shared memory partition data processing system of claim 8, wherein the hypervisor memory manager, responsive to the executing virtual processor encountering a page fault, allocates an input/output (I/O) paging request to the virtual processor from an I/O paging request pool and increments the outstanding I/O paging request count for the virtual processor, and prior to the allocating, determines whether there is a free I/O paging request in the I/O paging request pool, the I/O paging request pool being maintained by a hypervisor of the shared memory partition data processing system, and if so, allocates the free I/O paging request from the I/O paging request pool to the executing virtual processor encountering the hypervisor page fault, otherwise, places the virtual processor on a list of virtual processors waiting for a free I/O paging request, and places the virtual processor in a wait state with interrupt wake-up reasons enabled based on the virtual processor's state.

12. The shared memory partition data processing system of claim 11, wherein the hypervisor memory manager, responsive to freeing of an I/O paging request to the I/O paging request pool, determines whether the virtual processor is still blocked waiting on the freed I/O paging request, and if so, dispatches the virtual processor, otherwise, allows the virtual processor to continue execution responsive to a prior interrupt received while the freed I/O paging request was outstanding.

13. The shared memory partition data processing system of claim 11, wherein the hypervisor memory manager, responsive to freeing of the I/O paging request to the I/O paging request pool, determines whether there is a virtual processor on the list of virtual processors waiting for an I/O paging request, and if so, removes the virtual processor from the list of virtual processors waiting for an I/O paging request and initiates an I/O paging request for that virtual processor's pending hypervisor page fault.

14. The shared memory partition data processing system of claim 8, wherein N I/O paging requests are pre-assigned to each virtual processor of the shared memory partition data processing system, and wherein the predefined threshold is a number larger than N, wherein the executing virtual processor encountering the hypervisor page fault can employ more than N I/O paging requests at a time, notwithstanding the pre-assigning of only N I/O paging requests to the virtual processor.

15. An article of manufacture comprising:
at least one computer-readable storage medium having computer-readable program code logic to address a page fault in a shared memory partition data processing system, the computer-readable program code logic when executing on a processor performing:
determining whether an outstanding input/output (I/O) paging request count of I/O paging requests for an executing virtual processor is at a predefined threshold; and
performing any of:
based on the outstanding I/O paging request count for the virtual processor being below the defined threshold, placing the virtual processor in a wait state with interrupt wake-up reasons enabled based on the virtual processor's state, and
based on the outstanding I/O paging request count for the virtual processor being at the predefined threshold, then placing the virtual processor in a wait state with interrupt wake-up reasons disabled.

16. The article of manufacture of claim 15, further comprising pre-assigning N I/O paging requests per virtual processor of a plurality of virtual processors of the shared memory partition data processing system, wherein N is the predefined threshold.

17. The article of manufacture of claim 16, further comprising, responsive to completing one I/O paging request, freeing the one I/O paging request to an I/O paging request pool, decrementing the outstanding I/O paging request count for the virtual processor, and determining whether the virtual processor is still blocked waiting on the one, completed I/O paging request, and if so, dispatching the virtual processor.

18. The article of manufacture of claim 15, further comprising, responsive to the executing virtual processor encountering a page fault, allocating an input/output (I/O) paging request to the virtual processor from an I/O paging request pool and incrementing the outstanding I/O paging request count for the virtual processor, and prior to the allocating, determining whether there is a free I/O paging request in the I/O paging request pool, the I/O paging request pool being maintained by a hypervisor of the shared memory partition data processing system, and if so, allocating the free I/O paging request from the I/O paging request pool to the executing virtual processor encountering the hypervisor page fault, otherwise, placing the virtual processor on a list of virtual processors waiting for a free I/O paging request, and placing the virtual processor in a wait state with interrupt wake-up reasons enabled based on the virtual processor's state.

19. The article of manufacture of claim 18, further comprising, responsive to freeing of an I/O paging request to the I/O paging request pool, determining whether the virtual processor is still blocked waiting on the freed I/O paging request, and if so, dispatching the virtual processor, otherwise allowing the virtual processor to continue execution responsive to a prior interrupt while the freed I/O paging request was outstanding.

20. The article of manufacture of claim 18, further comprising, responsive to freeing of the I/O paging request to the I/O paging request pool, determining whether there is a virtual processor on the list of virtual processors waiting for an I/O paging request, and if so, removing the virtual processor from the list of virtual processors waiting for an I/O paging request and initiating an I/O paging request for that virtual processor's pending hypervisor page fault.

* * * * *